US008082306B2

(12) United States Patent
Maresh et al.

(10) Patent No.: US 8,082,306 B2
(45) Date of Patent: Dec. 20, 2011

(54) ENTERPRISE E-MAIL BLOCKING AND FILTERING SYSTEM BASED ON USER INPUT

(75) Inventors: Mark Edmund Maresh, Wake Forest, NC (US); Eric Allen Stegner, Durham, NC (US); Kimberly Irene Stegner, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/782,756

(22) Filed: Jul. 25, 2007

(65) Prior Publication Data

US 2009/0030989 A1    Jan. 29, 2009

(51) Int. Cl.
G06F 15/16    (2006.01)
(52) U.S. Cl. ........................................ 709/206; 709/205
(58) Field of Classification Search ........... 709/205–206
See application file for complete search history.

(56) References Cited

U.S. PATENT DOCUMENTS

| | | | | |
|---|---|---|---|---|
| 5,944,787 A * | 8/1999 | Zoken | ............................ | 709/206 |
| 5,999,932 A * | 12/1999 | Paul | ...................................... | 1/1 |
| 6,057,841 A * | 5/2000 | Thurlow et al. | ................ | 715/809 |
| 6,167,435 A * | 12/2000 | Druckenmiller et al. | ...... | 709/206 |
| 6,769,016 B2 * | 7/2004 | Rothwell et al. | .............. | 709/206 |
| 7,222,158 B2 * | 5/2007 | Wexelblat | ....................... | 709/206 |
| 7,366,761 B2 * | 4/2008 | Murray et al. | ................. | 709/206 |
| 7,433,923 B2 * | 10/2008 | Adkins | ........................... | 709/206 |
| 7,475,118 B2 * | 1/2009 | Leiba et al. | .................... | 709/206 |
| 7,532,890 B2 * | 5/2009 | Davies et al. | ................. | 455/449 |
| 7,627,670 B2 * | 12/2009 | Haverkos | ....................... | 709/224 |
| RE41,411 E * | 6/2010 | Cobb | ............................. | 709/206 |
| 7,730,145 B1 * | 6/2010 | Frenkel et al. | ................. | 709/206 |
| 2002/0099681 A1 * | 7/2002 | Gainey et al. | ...................... | 707/1 |
| 2003/0233418 A1 * | 12/2003 | Goldman | ....................... | 709/206 |
| 2004/0003283 A1 * | 1/2004 | Goodman et al. | ............. | 713/201 |
| 2004/0054741 A1 * | 3/2004 | Weatherby et al. | ............ | 709/206 |
| 2004/0068543 A1 * | 4/2004 | Seifert | .......................... | 709/206 |
| 2004/0148330 A1 * | 7/2004 | Alspector et al. | .............. | 709/200 |
| 2004/0176072 A1 * | 9/2004 | Gellens | ........................ | 455/412.1 |
| 2006/0031328 A1 * | 2/2006 | Malik | ............................ | 709/206 |
| 2006/0085504 A1 | 4/2006 | Yang et al. | | |
| 2006/0168029 A1 * | 7/2006 | Fitzpatrick et al. | ............ | 709/206 |
| 2006/0195534 A1 * | 8/2006 | Isozaki et al. | .................. | 709/206 |
| 2006/0206574 A1 | 9/2006 | Bellegarda et al. | | |
| 2006/0212142 A1 | 9/2006 | Madani et al. | | |
| 2007/0124385 A1 * | 5/2007 | Denny et al. | ................... | 709/206 |
| 2007/0233787 A1 * | 10/2007 | Pagan | ............................ | 709/206 |

(Continued)

FOREIGN PATENT DOCUMENTS

WO    WO2006094184    *    9/2006

*Primary Examiner* — Carl Colin
*Assistant Examiner* — Catherine Thiaw
(74) *Attorney, Agent, or Firm* — Yee & Associates, P.C.; Steven L. Bennett (57) ABSTRACT

A system are blocks and filters e-mails at the enterprise level. Incoming e-mails having an incoming domain are received at an e-mail server. Incoming domains are compared to a list of blocked domains. in response to identifying the incoming domain within the list of blocked domains, the incoming e-mail is blocked from delivery to an intended recipient. Incoming domains are then compared to a first predefined category. If the incoming domain is identified within the first predefined category, the intended recipient is compared to the first distribution list. If the intended recipient is identified within the first distribution list, then the incoming e-mail is delivered to the intended recipient.

20 Claims, 6 Drawing Sheets

U.S. PATENT DOCUMENTS

2007/0294356 A1* 12/2007 Shimooka .................... 709/206
2008/0177843 A1* 7/2008 Gillum et al. ................ 709/206
2008/0250106 A1* 10/2008 Rugg et al. .................. 709/206
2009/0044006 A1* 2/2009 Shim et al. ................... 713/151
2010/0281535 A1* 11/2010 Perry et al. ..................... 726/22

* cited by examiner

ENTERPRISE E-MAIL BLOCKING AND FILTERING SYSTEM BASED ON USER INPUT

BACKGROUND OF THE INVENTION

1. Field of the Invention

The present invention relates generally to an improved data processing system and in particular to a method, apparatus and computer program product for blocking and filtering incoming e-mails at the enterprise level. Still more particularly, the present invention relates to a computer implemented method, apparatus and computer program product for blocking and filtering incoming e-mails at the enterprise level based on input from individual clients.

2. Description of the Related Art

The expanding use of computers and the internet around the world has resulted in an explosion in the amount of e-mail that is received by businesses and individuals. This increase in e-mail has proved a ready marketing medium for advertisements. Once a commercial advertiser is in possession of an address, an advertiser can begin sending electronic advertisements to that address. Further, known and valid e-mail addresses are often shared among advertisers, so that once an address is known by one advertiser, other advertisers are often able to obtain the e-mail address as well. This can result in businesses and individuals receiving quite a bit of unsolicited e-mail, or spam, from unknown marketers. The huge volume of spam that assaults an e-mail address can have taxing results on the network resources of a business, as well as eroding the productivity of employees. Spam can be deleted individually by the recipient, however this does nothing to prevent the loss of productivity and system resources.

Networks often maintain a database of addresses of known senders of spam, which can be automatically discarded upon receipt by the network before the spam is delivered to an individual account. However, this global blocking assumes that no account in the system would be interested in viewing the mail. Still other methods use keyword filters. Incoming e-mails are scanned for the inclusion of some pre-determined keywords, and if detected, the message may be discarded.

Each of the global methods described above presume that each individual account has no interest or legitimate reason to receive the spam. For example, an e-mail related to hotel accommodations might be stereotyped as spam, and deleted, even though personnel routinely making trips for the business might benefit from receiving such an e-mail.

Despite the methods described above, there remains no way of personalizing an e-mail filtering or blocking system so that user input is taken into account when determining the blocked and filtered domains.

BRIEF SUMMARY OF THE INVENTION

The present invention provides a method, apparatus and computer program product for blocking and filtering e-mails at the enterprise level in a network environment. Incoming e-mails having an incoming domain are received at an e-mail server. The incoming domain is compared to a list of blocked domains to determine whether the incoming domain is within the list of blocked domains. If the incoming domain is within the list of blocked domains, delivery of the incoming e-mail to an intended recipient is prevented. If the incoming domain is not within the list of blocked domains, the incoming domain is compared to at least one predefined category, wherein each category has a distribution list. If the incoming domain is within one of the predefined categories, the corresponding distribution list is searched to determine whether the intended recipient is included within the list. If the intended recipient is within the first distribution list, the incoming e-mail is delivered to the intended recipient. The list of domains within the blocked domain list and the predefined categories are user suggested domains from previously received e-mails.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Figure 1:
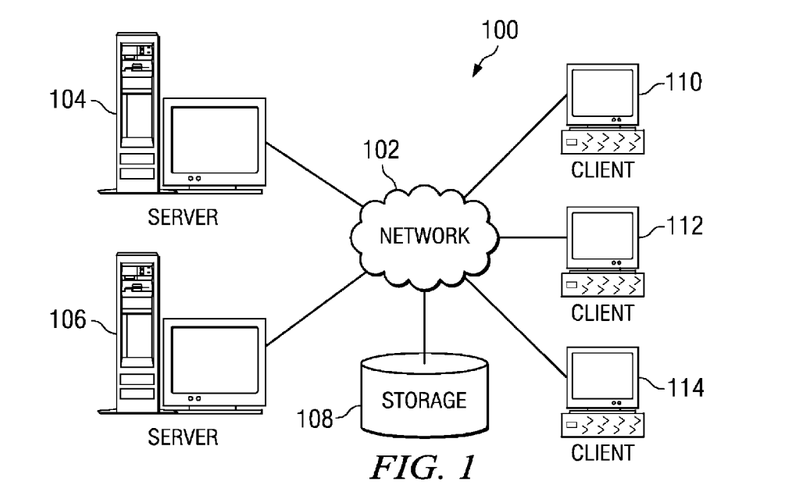
FIG. 1 is a pictorial representation of a network of data processing systems in which the present invention may be implemented.
Figure 2:
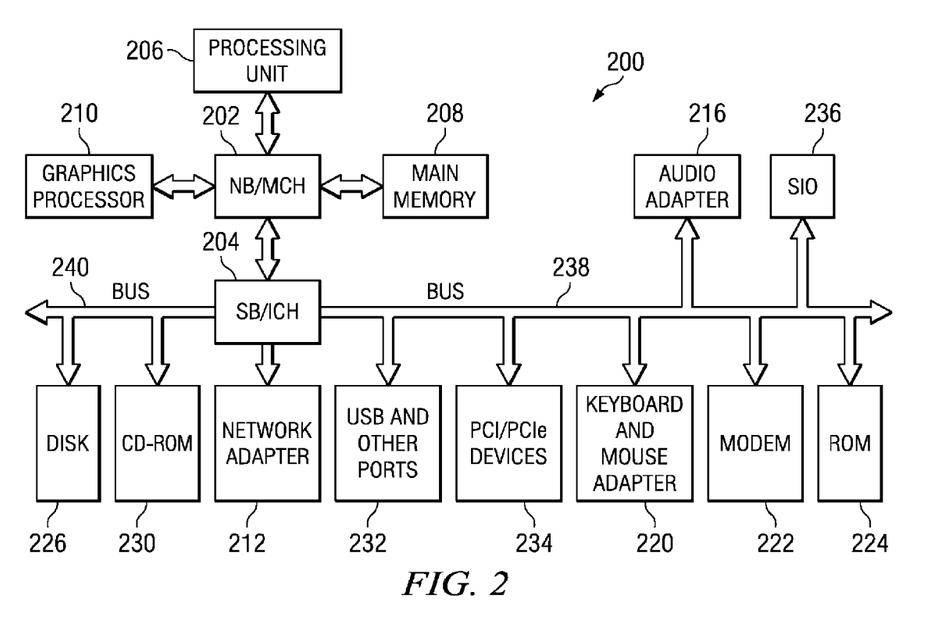
FIG. 2 is a block diagram of a data processing system that may be implemented as a server in accordance with a preferred embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
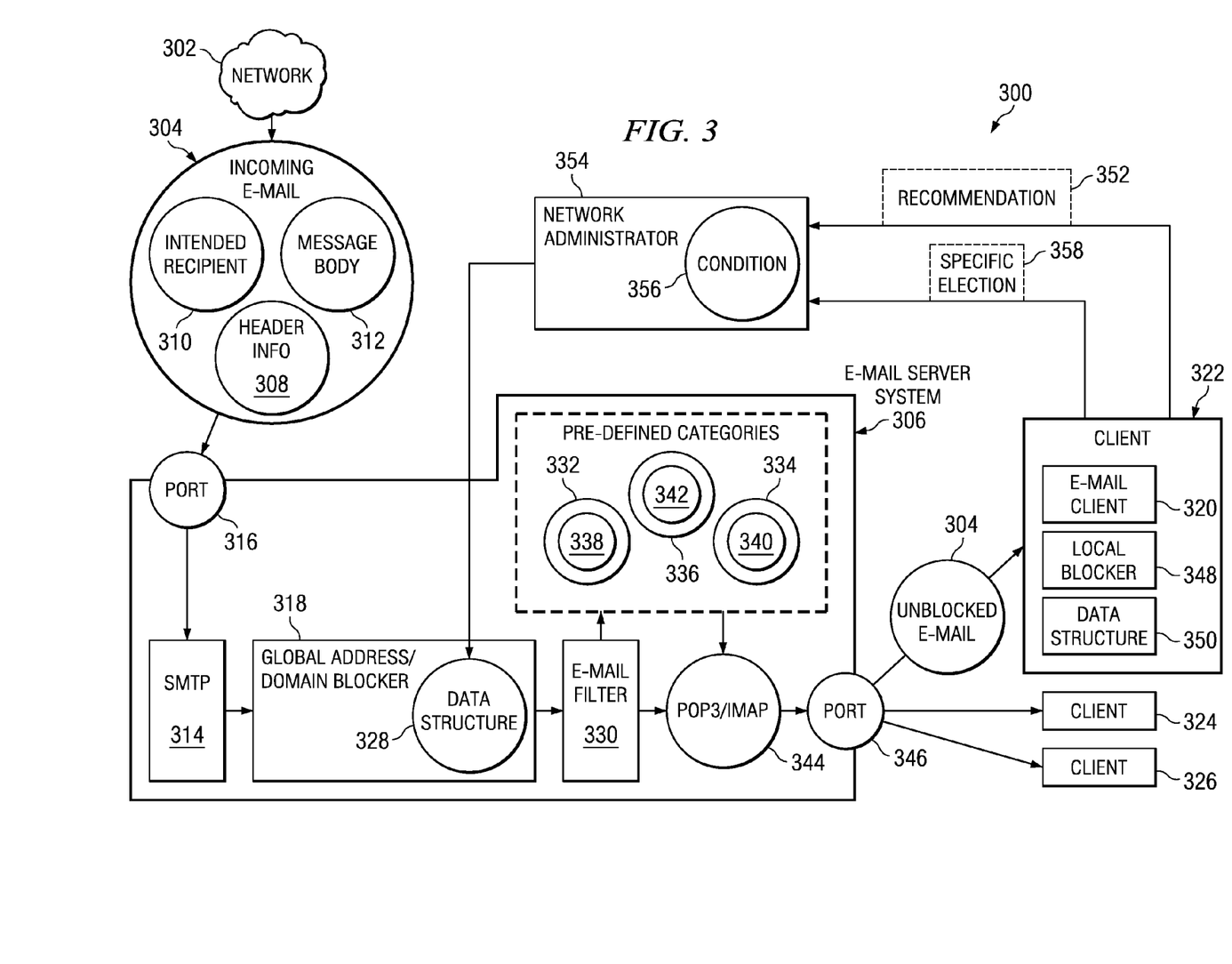
FIG. 3 is a block diagram illustrating a dataflow through an e-mail server system and associated e-mail clients in accordance with an illustrative embodiment.

With reference now to FIG. 3, a block diagram illustrating a dataflow through an e-mail server system and associated e-mail clients is shown in accordance with an illustrative embodiment. Process 300 is implemented in any type of networked computing device. In this example, process 300 is a process that executes on a client and a server, such as client 110 and server 104 in FIG. 1.

Network 302 forwards an incoming e-mail 304 to e-mail server system 306. Network can be any network, such as network 102 in FIG. 1. The e-mail server system is implemented on a server, such as server 104, 106 in FIG. 1.

Incoming e-mail 304 is comprised at least of header information 308, an intended recipient 310, and message body 312. Header information 308 can include the sender of the incoming e-mail, the subject of the incoming e-mail, and may also show the time and date of the incoming e-mail as well as the message size of the incoming e-mail. The sender is typically comprised of at least an account name and a domain name.

E-mail server system 306 connects to network 302 using a mail transfer process, such as simple mail transfer protocol 314 (hereinafter, SMTP 314). SMTP 314 receives incoming e-mail 304 through port 316. Port 316 can be any port providing access for SMTP 314 to the network 302. For a typical server architecture, port 316 is usually port 25.

SMTP 314 forwards incoming e-mail 304 to global blocker 318. Global blocker 318 is a software process within e-mail server system 306 that blocks certain e-mails at the enterprise level, preventing any delivery to any client at the enterprise, i.e., at that domain. E-mails blocked at the enterprise level are not delivered to e-mail client 320 running on clients 322, 324, 326.

Global blocker 318 compares header information 308, including the incoming domain name, to a list of blocked domains in the associated data structure 328. As discussed below, the list of blocked domains can be a list of client recommended domains from the domains of previous e-mails. If an entry is found within the data structure 328 of blocked domains corresponding to header information 308, the incoming e-mail 304 is not delivered. The incoming e-mail 304 is blocked at the enterprise level and is not delivered to the intended recipient 310 at e-mail client 320.

If an entry is not found within the data structure 328 of blocked domains corresponding to header information 308, global blocker 318 forwards the incoming e-mail 304 to e-mail filter 330. E-mail filter 330 is a software process within e-mail server system 306 that filters e-mails at the enterprise level into predefined categories 332-336 based on header information 308, and specifically based on the domain of header information 308. If the domain of header information 308 corresponds to an entry in predefined category 332-336, incoming e-mail 304 is filtered into that category. The filtering process itself can be accomplished through an earmarking system, or by providing a separate text file, for each predefined category 332-336.

Each of the predefined categories 332-336 has a distribution list 338-342 associated therewith. Distribution lists 338-342 are data structures, each including a list of clients that have subscribed to that predefined category 332-336. Incoming e-mail 304 that has been filtered into one of predefined categories 332-336 is only delivered to the intended recipient 310 if intended recipient 310 is one of the subscribing clients to predefined category 332-336 into which the incoming e-mail 304 has been filtered.

If the domain of header information 308 does not correspond to an entry in predefined category 332-336, incoming e-mail 304 remains unfiltered. Unfiltered e-mails are delivered normally, i.e., unblocked and unfiltered, to the intended recipient 310.

Client 322 running e-mail client 320, such as clients 110-114 in FIG. 1, accesses e-mail server system 306 using an incoming mail protocol, such as a Post Office Protocol (POP) or Internet Mail Access Protocol (IMAP) server—collectively "POP3 344". POP3 344 accesses incoming e-mail 304 through port 346. Port 346 can be any port providing access for client 322 to POP3 344. For a typical server architecture, port 316 is usually port 110.

E-mail client 320 is any e-mail process implemented on a client that allows a user to view e-mails. E-mail client 320 can be a stand alone program, such as Microsoft Outlook, Outlook Express, Eudora or Pegasus. Alternatively, e-mail client 320 can be implemented as a web page in a web based e-mail server, such as Hotmail or Yahoo. Clients 322-326 are clients such as clients 110-114 in FIG. 1.

Once connected to e-mail server system 306, e-mail client 320 downloads incoming e-mail 304 to the e-mail client 320, if incoming e-mail was not blocked or filtered. Blocked e-mail is not delivered. Incoming e-mail 304 that has been filtered into one of predefined categories 332-336 is only delivered to the intended recipient 310 if intended recipient 310 is one of the subscribing clients to predefined category 332-336 into which the incoming e-mail 304 has been filtered. Incoming e-mail 304 that has not been blocked or filtered is delivered to the intended recipient 310 at clients 322-326.

Clients 322-326 can choose to locally block incoming e-mail 304 by a method similar to that employed for global blocker 318. Local blocker 348 compares header information 308 to a list of blocked domains in the associated data structure 350. If an entry is found within data structure 350 of blocked domains corresponding to header information 308, incoming e-mail 304 is not downloaded to e-mail client 320. Incoming e-mail 304 is blocked at the local level and is not delivered to intended recipient 310. E-mail client 320 typically provides instructions to e-mail server system 306 to delete an undelivered, locally blocked incoming e-mail 304 from an associated text file on e-mail server system 306.

After receiving incoming e-mail 304, client 322-326 can send recommendation 352 to network administrator 354. Recommendation 352 may be a suggestion that the sender, including either or both of the account name and the domain contained in header information 308 be added to data structure 328 of global blocker 318. The recommendation 352 may also be a suggestion that the sender, including either or both of the account name and the domain contained in header information 308 be associated with predefined category 332-336 so that subsequent e-mails from the sender are filtered into one of predefined categories 332-336. The recommendation 352 may also be a suggestion that a new predefined category be established, and that the sender be associated therewith.

The network administrator 354 can be a software process with one or more conditions 356 that must be satisfied before any changes to data structure 328 are implemented. For example, network administrator 354 may include condition 356 that a quota of recommendations that must be received from different clients, identifying the same header information 308, including the same account name or domain, before header information 308 will be added to data structure 328 of global blocker 318. Similarly, network administrator 354 may include condition 356 that a quota of recommendations that must be received from different clients, identifying the same header information 308, including the same account name or domain, before header information 308 will be associated with predefined categories 332-336 so that subsequent e-mails from the sender are filtered into one of the predefined categories 332, 334, 336. Additionally, network administrator 354 may include condition 356 that a quota of recommendations must be received from different clients, identifying the same header information 308, including the same account name or domain, before header information 308 will be used to establish a new a predefined category.

The network administrator 354 can be an automated process, requiring little to no input from a person overseeing the process. Alternatively, network administrator 354 may be implemented to require manually updating predefined categories 332-336 or data structure 328 of global blocker 318 to include header information 308 included in recommendation 352.

Thus, the data structure 328 of global blocker 318 and predefined categories 332-336 can be constantly updated by utilizing suggestions, such as recommendation 352, from clients 322-326. Therefore, a client might encounter a scenario wherein predefined categories 332-336 are updated to include the domain of a known sender. Clients 322-326 might not receive e-mails that they are interested in receiving if clients 322-326 are not subscribed to the predefined categories 332-336 and included in distribution list 338-342 associated therewith.

To prevent this communication gap, client 322, 324, 326 may send a specific election 358 to the network administrator 354. Specific election 358 is an indication that the client 322-326 would like to continue to receive subsequent e-mails from the sender of incoming e-mail 304. After indicating specific election 358, a subsequent e-mail having header information similar to header information 308 of incoming e-mail 304, will be delivered to client 322-326, regardless of whether client 322-326 is subscribed to predefined categories 332-336, with which header information 308 is associated. A client could therefore receive e-mail from a specific domain without being subscribed to the predefined category which the domain is associated. Likewise, a client could utilize specific election 358 to receive e-mail from a specific domain, without receiving other e-mails from other domains commonly associated with the predefined category with which the specific domain is associated.

Figure 4:
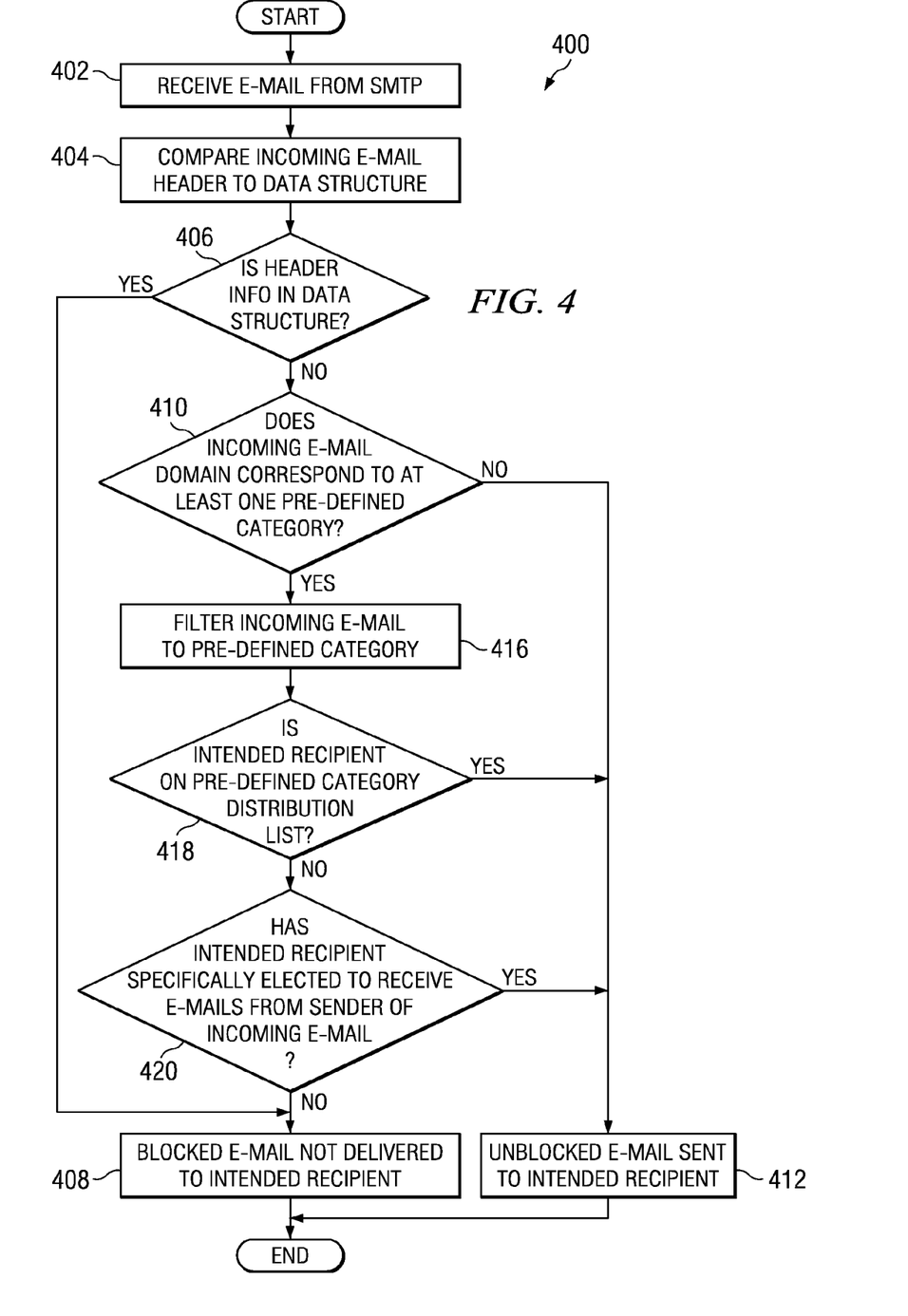
FIG. 4 is a flowchart illustrating a process for an e-mail server system providing e-mail blocking and filtering in accordance with an illustrative embodiment.

Referring now to FIG. 4, a flowchart illustrating a process for an e-mail server system providing e-mail blocking and filtering is shown in accordance with an illustrative embodiment. Process 400 in FIG. 4 may be implemented by a software component for providing e-mail blocking and filtering to an e-mail client. For example, the process may be implemented by an e-mail server system, such as e-mail server system 306 in FIG. 3.

Process 400 begins by receiving an incoming e-mail from the SMTP server, such as SMTP server 314 in FIG. 3 (step 402). Incoming e-mail is comprised at least of header information, an intended recipient, and message body. Header information can include the sender of the incoming e-mail, the subject of the incoming e-mail, and may also show the time and date of the incoming e-mail as well as the message size of the incoming e-mail. The sender is typically comprised of at least a account name and a domain name.

Process 400 then compares the header information, specifically the domain name, to a list of globally blocked domains in an associated data structure (step 404). A determination is then made whether the incoming header information is located in the data structure (step 406). If an entry corresponding to header information is found within the associated data structure of blocked domains ("Yes" at step 406), process 400 does not deliver the incoming e-mail. The incoming e-mail is blocked at the enterprise level and is not delivered to the intended recipient (step 408).

If an entry corresponding to header information is found within the associated data structure of blocked domains ("No" at step 406), the incoming e-mail is next compared to a listing of predefined categories to determine whether the domain of the incoming e-mail corresponds to an entry in at least one of the predefined categories (step 410). If the domain of the incoming e-mail does not correspond to an entry in one of the predefined categories ("No" at step 410), the incoming e-mail remains unfiltered. The incoming e-mail is then forwarded for delivery to its intended recipient (step 412). That is, unfiltered e-mails are delivered normally, i.e., unblocked and unfiltered, to the intended recipient of the incoming e-mail. Forwarding the incoming e-mail can consist of forwarding the incoming e-mail to a text file associated with the intended recipient to await transfer to an e-mail client.

If the domain for the incoming e-mail does correspond to an entry in one of the predefined categories ("Yes" at step 412), process 400 filters the incoming e-mail into that category (step 416). The filtering process itself can be accomplished through an earmarking system, or by providing a separate text file for each of the predefined categories. Consequently, an incoming e-mail that is not blocked and has a domain corresponding to an entry in one of the predefined categories is filtered at the enterprise level into the corresponding predefined category.

Process 400 then compares the intended recipient of the incoming e-mail to a distribution list associated with the predefined category into which the incoming e-mail was filtered (step 418). If the intended recipient is listed on the distribution list associated with the predefined category into which the incoming e-mail was filtered ("Yes" at step 418), process 400 forwards the incoming e-mail for delivery to its intended recipient (step 412). Therefore, an incoming e-mail that has been filtered into a predefined category is only delivered to the intended recipient if intended recipient is one of the subscribing clients to the predefined category into which the incoming e-mail has been filtered.

If the intended recipient is not listed on the distribution list associated with the predefined category into which the incoming e-mail was filtered ("No" at step 418), process 400 checks to see if the intended recipient has made a specific election to receive e-mails from the sender of the incoming e-mail (step 420). If the intended has made a specific election to receive e-mails from the sender of the incoming e-mail ("Yes" at step 420), process 400 forwards the incoming e-mail for delivery to its intended recipient (step 412), and the process terminates thereafter.

If the intended recipient has not made a specific election to receive e-mails from the sender of the incoming e-mail ("No" at step 420), process 400 returns to step 408 and does not deliver the incoming e-mail. Process 400 terminates thereafter. The incoming e-mail is filtered out of the e-mails to be forwarded to the intended recipient at the enterprise level and is not delivered to the intended recipient (step 408).

Figure 5:
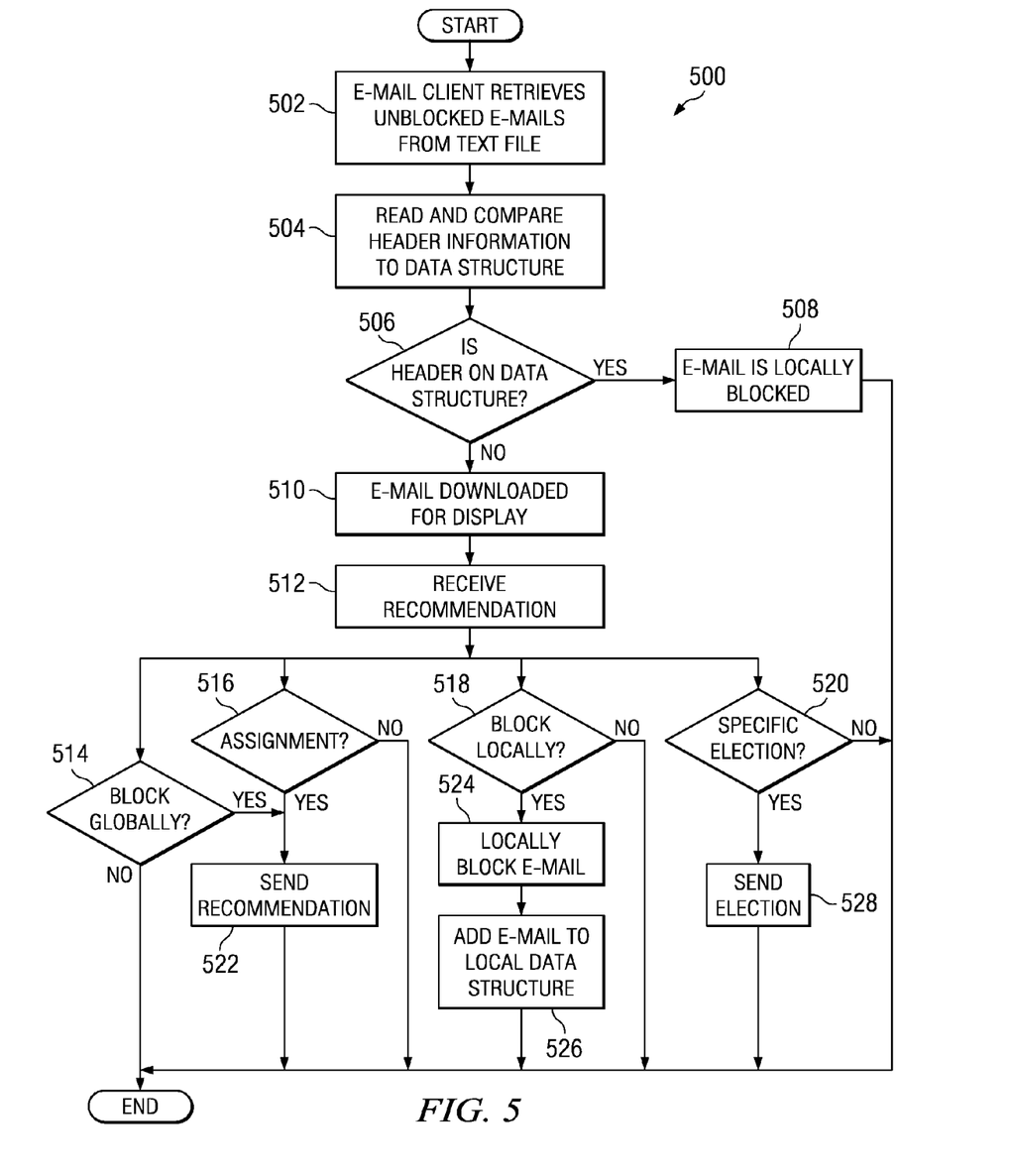
FIG. 5 is a flowchart illustrating a process for an e-mail client that allows a user to view e-mails, locally block incoming e-mails, recommend domains and predefined filters for global filtering, recommend domains for global blocking, and make specific elections with regard to senders in accordance with an illustrative embodiment.

Referring now to FIG. 5, a flowchart illustrating a process for an e-mail client that allows a user to view e-mails, locally block incoming e-mails, recommend domains and predefined filters for global filtering, recommend domains for global blocking, and make specific elections with regard to senders is shown in accordance with an illustrative embodiment. Process 500 in FIG. 5 may be implemented by a software component for providing e-mail services to a client. For example, the process 500 may be implemented by an e-mail client, such as e-mail client 320 in FIG. 3.

Process 500 begins by accessing an e-mail server system using an incoming mail protocol, such as a Post Office Protocol (POP) or Internet Mail Access Protocol (IMAP)

server—collectively "POP3", and retrieves unblocked e-mails from the text file (step 502). Process 500 of the e-mail client compares the header information, specifically the domain name, of the incoming e-mail to a list of locally blocked domains in an associated data structure (step 504). A determination is then made whether the header information is located within the local data structure (step 506). If an entry corresponding to header information is found within the associated data structure of blocked domains ("Yes" at step 506), process 500 does not display the incoming e-mail. The incoming e-mail is blocked at the client level and is not delivered to the intended recipient (step 508) with the process terminating thereafter. Process 500 may optionally provide instructions to either or both of the e-mail client and the e-mail server system to delete the incoming e-mail (not shown).

If an entry corresponding to header information is not found within the associated data structure of blocked domains ("No" at step 506), process 500 displays the incoming e-mail (step 510). Process 500 does not retrieve incoming e-mail that has been blocked, for example by process 400 as described in FIG. 4 above. Process 500 retrieves incoming e-mail that has been filtered into a predefined category only if the intended recipient is one of the subscribing clients to the predefined category into which the incoming e-mail has been filtered. Additionally, process 500 does retrieve unfiltered and unblocked incoming e-mail.

Process 500 can receive a recommendation from the client recipient regarding filtering, local blocking and global blocking of future e-mails originating from the same domain as the incoming e-mail (step 512). As part of the recommendation, process 500 can, simultaneously or sequentially, perform any of the following actions: process 500 can recommend to a Network Administrator that the domain for the incoming e-mail be globally blocked (step 514); process 500 can recommend to a Network Administrator that the domain for the incoming e-mail be assigned to an existing predefined category, or that a new category be created and the incoming e-mail be assigned to that new category (step 516); process 500 can locally block the incoming e-mail (step 518); and process 500 can send a specific election to the network administrator (step 520).

As shown at step 522, process 500 can recommend to a Network Administrator that the domain for the incoming e-mail be globally blocked (step 522). If a recommendation is sent to the network administrator ("yes" at step 514), the recommendation would include at least a suggestion that the sender, including either or both of the account name and the domain contained in header information of the incoming e-mail be added to data structure of global blocker. Should the Network Administrator eventually add the domain contained in header information of the incoming e-mail to data structure of global blocker, any subsequent e-mails received at the e-mail server system from that domain would be globally blocked at the enterprise level and not delivered to any e-mail client.

Also indicated at step 516, process 500 can recommend to a Network Administrator that the domain for the incoming e-mail be assigned to an existing predefined category, or that a new category should be created and the incoming e-mail be assigned to that new category. If a recommendation is sent to the network administrator ("yes" at step 516), the recommendation would include at least a suggestion that the sender, including either or both of the account name and the domain contained in header information be associated with a predefined category. Should the Network Administrator eventually add the domain contained in header information of the incoming e-mail into a newly created or existing predefined category, any subsequent e-mails from the sender would be filtered into that predefined category. Process 500 would then only receive subsequent e-mails from the sender (and the sender's domain) if the client running process 500 is a subscribing client to the predefined category into which the subsequent e-mail is filtered.

If a recommendation is not sent to the network administrator ("no" at step 516), the process terminates.

If process 500 determines to locally block the e-mail ("yes" at step 518), e-mails are blocked locally (step 524). Process 500 adds the header information of the incoming e-mail, specifically the domain name, to a list of locally blocked domains in an associated data structure (step 526) with the process terminating thereafter.

If process 500 determines not to locally block the e-mail ("no" at step 518) process 500 terminates.

As shown at step 528, process 500 can send a specific election to the network administrator with the process terminating thereafter. If the client chooses to send a specific election to the e-mail server system ("yes" at step 520), the process indicates to the e-mail server system a desire by the client to continue to receive subsequent e-mails from the sender of incoming e-mail. After indicating specific election, any subsequent e-mail having header information similar to header information of the incoming e-mail, will be delivered to the client regardless of whether the client is subscribed to the predefined categories with which header information is associated. A client could therefore receive e-mail from a specific domain without being subscribed to the predefined category that the domain is associated with. Likewise, a client could utilize the specific election to receive e-mail from a specific domain, without receiving other e-mails from other domains commonly associated with the predefined category with which the specific domain is associated.

If the client does not choose to send a specific election to the e-mail server system ("no" at step 520), process 500 terminates.

Figure 6:
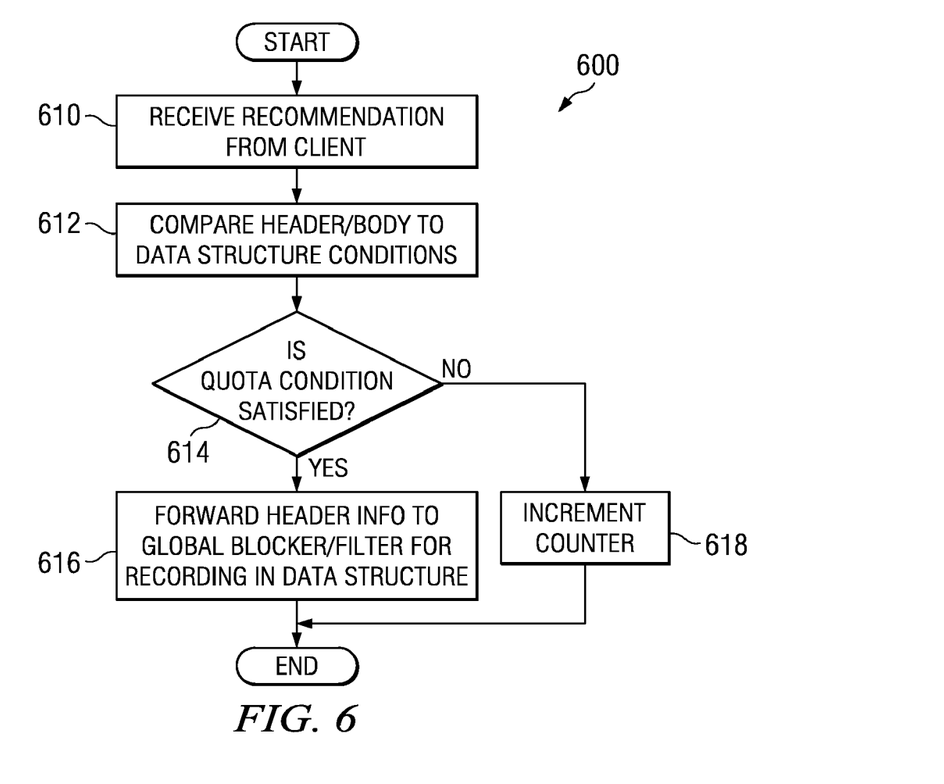
FIG. 6 is a flowchart illustrating a process for an automated network administrator for updating associated data structures of processes providing e-mail blocking and filtering by utilizing suggestions from clients in accordance with an illustrative embodiment.

Referring now to FIG. 6, a flowchart illustrating a process for an automated network administrator for updating associated data structures of processes providing e-mail blocking and filtering by utilizing suggestions from clients is shown in accordance with an illustrative embodiment. Process 600 in FIG. 6 may be implemented by a software component for providing Network Administrator functionality to an e-mail server system. For example, process 600 may be implemented by a Network Administrator, such as Network Administrator 354 in FIG. 3. Alternatively, the network administrator may be implemented to require manually updating the predefined categories or the data structure of global blocker to include header information included in a recommendation from the e-mail client.

Process 600 begins by receiving a recommendation from a client (step 610). The recommendation should include a sender, including either or both of the account name and the domain. The recommendation may be a suggestion that the sender of an e-mail, including either or both of the account name and the domain contained in header information, be added to the data structure of a global blocker. The recommendation may also be a suggestion that the sender, including either or both of the account name and the domain contained in header information, be associated with a predefined category of the global filter, so that subsequent e-mails from the sender are filtered into one of the predefined categories. The recommendation may also be a suggestion that a new predefined category be established, and that the sender of the incoming mail be associated therewith.

Process 600 then compares the sender, including the domain, identified in the recommendation with one or more conditions, to determine whether the sender is in violation of, or satisfies one of those conditions (step 612). The conditions provide guidelines which must be complied with before any changes to data structure are implemented.

For example, step 610 may include a condition that a quota of recommendations must be received from different clients, identifying the same header information, including the same account name or domain, before header information will be added to data structure of global blocker. A determination is made as to whether the quota condition is satisfied (step 614). If the recommendation results in the quota of required recommendations being met, then the recommendation satisfies the quota condition ("Yes" at step 614). Process 600 then updates the data structure of global blocker to include at least the domain of the sender (step 614). If the recommendation does not result in the quota of required recommendations being met ("No" at step 614), the data structure of global blocker will not be updated. A counter associated with the recommendation for global blocking and the domain may be established or incremented (step 618), with the process terminating thereafter. Subsequent recommendations to add the same domain to the data structure of the global blocker will update the counter until the quota of required recommendations is met, at which time the data structure of global blocker will be updated to include the domain.

Similarly, process 600 may include condition at step 610 that a quota of recommendations must be received from different clients, identifying the same header information, including the same account name or domain, before header information will be associated with a predefined category, either new or existing, for global filtering. A determination is made as to whether the quota condition is satisfied (step 614). If the recommendation results in the quota of required recommendations being met, then the recommendation satisfies the condition ("Yes" at step 614). Process 600 then updates the predefined category to associate the either or both of the account name and the domain contained in header information with the recommended predefined category (step 614), with the process terminating thereafter. Process 600 could similarly implement a new predefined category according to the recommendation. Subsequent e-mails from the sender are filtered into the associated predefined category. If the recommendation does not result in the quota of required recommendations being met ("No" at step 614), the recommended domain will not be associated with the recommended predefined category. A counter associated with the recommendation for and the domain may be updated or established (step 618), with the process terminating thereafter. Subsequent recommendations to associate the domain with the recommended predefined category update the counter until the quota of required recommendations is met. Thereafter, the domain is associated with the recommended predefined category.

In an alternative embodiment, process 600 may be implemented to require manually updating predefined categories or data structure of the global blocker to include header information included in recommendation. This alternative would allow greater flexibility by the network administrator, and would allow flexibility in the application of any conditions.

Figure 7:
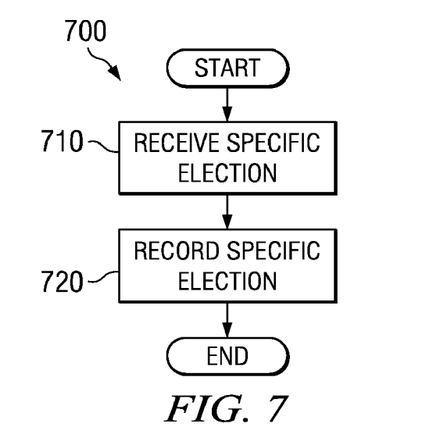
FIG. 7 is a flowchart illustrating a process for a network administrator for receiving a specific election in accordance with an illustrative embodiment.

Referring now to FIG. 7, a flowchart illustrating a process 700 for a network administrator for receiving a specific election is shown in accordance with an illustrative embodiment. Process 700 in FIG. 7 may be implemented by a software component for providing network administrator functionality to an e-mail server system. For example, process 700 may be implemented by a network administrator, such as network administrator 354 in FIG. 3.

Process 700 receives specific election from a client that the client would like to continue to receive subsequent e-mails from sender with certain account names or domain names (step 710). Process 700 then records the specific election, including the client and the sender, into an associated data structure (step 720), with the process terminating thereafter. The specific election acts as an exception to the predefined categories of the global filter. After indicating specific election, a subsequent e-mail having header information similar to header information of incoming e-mail, will be delivered to client, regardless of whether client is subscribed to predefined categories, with which header information is associated. A client could therefore receive e-mail from a specific domain without being subscribed to the predefined category with which the domain is associated. Likewise, a client could utilize specific election to receive e-mail from a specific domain, without receiving other e-mails from other domains commonly associated with the predefined category with which the specific domain is associated.

In an alternative embodiment, process 700 may be implemented to require manually updating the data structure to include specific elections.

Figure 8:
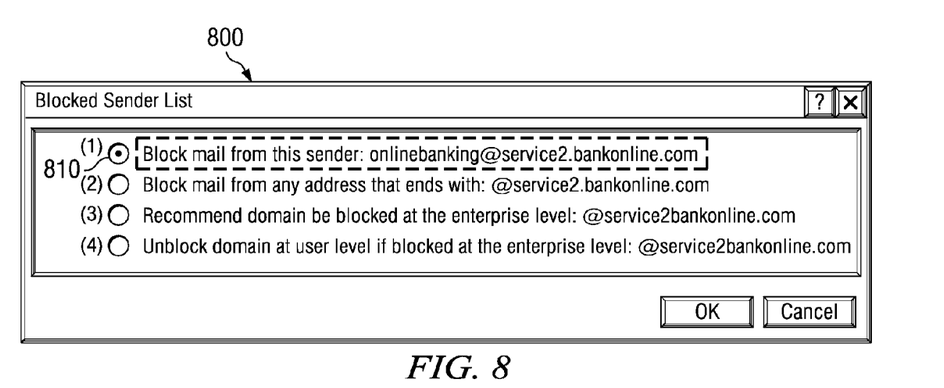
FIG. 8 is exemplary data screen showing a client selection of locally blocking a sender in accordance with an illustrative embodiment.

Referring now to FIG. 8, an exemplary data screen showing a client selection of locally blocking a sender is shown in accordance with an illustrative embodiment. Upon receiving an incoming e-mail, a client, such as clients 110-114 in FIG. 1, can call input screen 800. Upon checking box 810, indicating that the sender should be locally blocked, a process, such as process 500 in FIG. 5, is executed at the client. After the client chooses to locally block the sender's address, any subsequent e-mail from the sender would correspond to the header information in the associated data structure of blocked domains. The incoming e-mail is not retrieved from the e-mail server system. The incoming e-mail is blocked at the client level and is not delivered to the intended recipient. Instructions can be provided to either or both of the e-mail client and the e-mail server system to delete the incoming e-mail.

Figure 9:
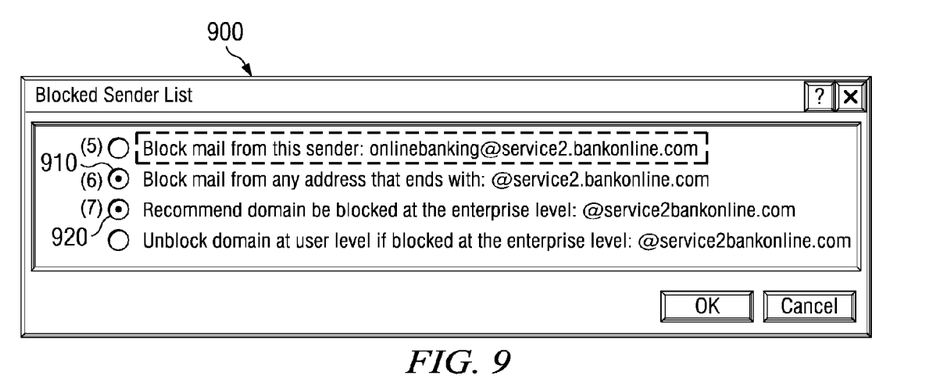
FIG. 9 is an exemplary data screen showing a client selection of locally blocking a sender as well as a client recommendation that the sender's domain be globally blocked at the enterprise level in accordance with an illustrative embodiment.

Referring now to FIG. 9, an exemplary data screen showing a client selection of locally blocking a sender as well as a client recommendation that the sender's domain be globally blocked at the enterprise level is shown in accordance with an illustrative embodiment. Upon receiving an incoming e-mail, a client, such as clients 110-114 in FIG. 1, can call input screen 900. Upon checking box 910, indicating that the sender's domain should be locally blocked, a process, such as process 500 in FIG. 5, is executed at the client. After the client chooses to locally block the sender's domain, any subsequent e-mail from that domain would correspond to the header information in the associated data structure of blocked domains. The incoming e-mail is not retrieved from the e-mail server system. The incoming e-mail is blocked at the client level and is not delivered to the intended recipient. Instructions can be provided to either or both of the e-mail client and the e-mail server system to delete the incoming e-mail.

Upon checking box 920, indicating that the sender's domain is recommended to the network administrator to be globally blocked, a process, such as process 500 in FIG. 5, is executed at the client. The recommendation would include at least a suggestion forwarded to the network administrator that the sender, including either or both of the account name and the domain contained in header information of the incoming e-mail, be added to data structure of global blocker. Should the network administrator eventually add the domain contained in header information of the incoming e-mail to the data structure of global blocker, any subsequent e-mails received at the e-mail server system from that domain would be globally blocked at the enterprise level and not delivered to any e-mail client.

Similarly, a client could make a recommendation to a network administrator that the domain for the incoming e-mail be assigned to an existing predefined category, or that a new category should be created and the incoming e-mail be assigned to that new category (not shown). The recommendation would include at least a suggestion that the sender, including either or both of the account name and the domain contained in header information, be associated with a predefined category. Should the network administrator eventually add the domain contained in header information of the incoming e-mail into a newly created or existing predefined category, any subsequent e-mails from the sender would be filtered into that predefined category. The client would then only receive subsequent e-mails from the sender (and the sender's domain) if the client is a subscribing client to the predefined category into which the subsequent e-mail is filtered.

Figure 10:
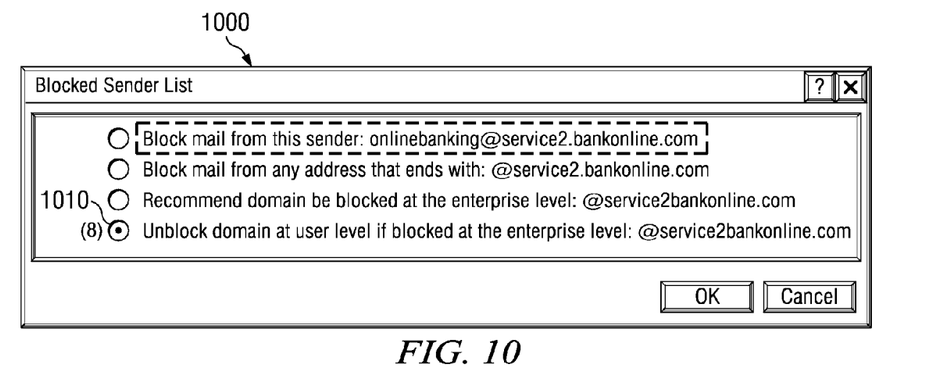
FIG. 10 is an exemplary data screen showing a client's specific election to continue to receive subsequent e-mails from a sender in accordance with an illustrative embodiment.

Referring now to FIG. 10, an exemplary data screen showing a client's specific election to continue to receive subsequent e-mails from a sender is shown in accordance with an illustrative embodiment. Upon receiving an incoming e-mail, a client, such as clients 110-114 in FIG. 1, can call input screen 1000. Upon checking box 1010, indicating that a specific election of the sender's name or domain is made, a process, such as process 500 in FIG. 5, is executed at the client. When the client chooses to send a specific election to the e-mail server system, the process indicates to the e-mail server system a desire by the client to continue to receive subsequent e-mails from the sender of incoming e-mail. After indicating specific election, any subsequent e-mail having header information similar to header information of the incoming e-mail, will be delivered to the client regardless of whether the client is subscribed to the predefined categories with which header information is associated. A client could therefore receive e-mail from a specific domain without being subscribed to the predefined category with which the domain is associated. Likewise, a client could utilize the specific election to receive e-mail from a specific domain, without receiving other e-mails from other domains commonly associated with the predefined category with which the specific domain is associated.

Thus, the illustrative embodiments provide a method, apparatus and computer program product for blocking and filtering e-mails at the enterprise level in a network environment. Incoming e-mails having an incoming domain are received at an e-mail server. The incoming domain is compared to a list of blocked domains to determine whether the incoming domain is within the list of blocked domains. If the incoming domain is within the list of blocked domains, delivery of the incoming e-mail to an intended recipient is prevented. If the incoming domain is not within the list of blocked domains, the incoming domain is compared to at least one predefined category, wherein each category has a distribution list. If the incoming domain is within the one of the predefined categories, the corresponding distribution list is searched to determine whether the intended recipient is included within the list. If the intended recipient is within the first distribution list, the incoming e-mail is delivered to the intended recipient. The list of domains within the blocked domain list and the predefined categories are user suggested domains from previously received e-mails.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a non-transitory computer-usable or non-transitory computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The non-transitory medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for blocking and filtering e-mails at the enterprise level, the method comprising:

receiving an incoming e-mail having an incoming domain;

comparing the incoming domain to a list of blocked domains;

in response to identifying the incoming domain within the list of blocked domains, preventing delivery of the incoming e-mail to an intended recipient;

in response to not identifying the incoming domain within the list of blocked domains, comparing the incoming domain to a first predefined category having a first distribution list;

in response to identifying the incoming domain within the first predefined category, comparing the intended recipient to the first distribution list; and in response to identifying the intended recipient within the first distribution list, delivering the incoming e-mail to the intended recipient.

2. The method of claim 1, wherein the list of blocked domains comprises a client recommended domain.

3. The method of claim 2, wherein the client recommended domain is a previous domain from a previous e-mail delivered to a client.

4. The method of claim 1, wherein the first predefined category comprises a client recommended domain.

5. The method of claim 4, wherein the client recommended domain is a previous domain from a previous e-mail delivered to a client.

6. The method of claim 1, wherein the first distribution list is a list of clients that have subscribed to receive e-mails where the incoming domain is within the first predefined category.

7. The method of claim 1, further comprising:
in response to not identifying the incoming domain within the first predefined category, delivering the incoming e-mail to the intended recipient.

8. The method of claim 1, further comprising:
in response to not identifying the incoming domain within the list of blocked domains, comparing the incoming domain to a second predefined category having a second distribution list;
in response to identifying the incoming domain within the second predefined category, comparing the intended recipient to the second distribution list; and
in response to identifying the intended recipient within the second distribution list, delivering the incoming e-mail to the intended recipient.

9. A non-transitory computer-readable medium having a computer program product encoded thereon for blocking and filtering e-mails at the enterprise level, the computer program product comprising:
responsive to receiving an incoming e-mail, first instructions for comparing an incoming domain of the incoming e-mail to a list of blocked domains;
responsive to the first instructions identifying the incoming domain within the list of blocked domains, second instructions for preventing delivery of the incoming e-mail to an intended recipient;
responsive to the first instructions not identifying the incoming domain within the list of blocked domains, third instructions for comparing the incoming domain to a first predefined category having a first distribution list;
responsive to the third instructions identifying the incoming domain within the first predefined category, fourth instructions for comparing the intended recipient to the first distribution list;
responsive to the fourth instructions identifying the intended recipient within the first distribution list, fifth instructions for delivering the e-mail to the intended recipient; and responsive to the fourth instructions not identifying the intended recipient within the first distribution list, not delivering the incoming e-mail to the intended recipient.

10. The non-transitory computer-readable medium of claim 9, wherein the list of blocked domains comprises a client recommended domain.

11. The non-transitory computer-readable medium of claim 10, wherein the client recommended domain is a previous domain from a previous e-mail delivered to a client.

12. The non-transitory computer-readable medium of claim 9, wherein the first predefined category comprises a client recommended domain.

13. The non-transitory computer-readable medium of claim 12, wherein the client recommended domain is a previous domain from a previous e-mail delivered to a client.

14. The non-transitory computer-readable medium of claim 9, wherein the first distribution list is a list of clients that have subscribed to receive e-mails where the incoming domain is within the first predefined category.

15. The non-transitory computer-readable medium of claim 9, the computer program product further comprising:
in response to not identifying the incoming domain within the first predefined category, sixth instructions for delivering the incoming e-mail to the intended recipient.

16. The non-transitory computer-readable medium of claim 9, the computer program product further comprising:
in response to not identifying the incoming domain within the list of blocked domains, instructions for comparing the incoming domain to a second predefined category having a second distribution list;
in response to identifying the incoming domain within the second predefined category, instructions for comparing the intended recipient to the second distribution list; and
in response to identifying the intended recipient within the second distribution list, instructions for delivering the incoming e-mail to the intended recipient.

17. A data processing system comprising:
a memory unit that contains a set of instructions; and
a processing unit, responsive to execution of the set of instructions, receiving an incoming e-mail having an incoming domain, comparing the incoming domain to a list of blocked domains, in response to identifying the incoming domain within the list of blocked domains, preventing delivery of the incoming e-mail to an intended recipient, in response to not identifying the incoming domain within the list of blocked domains, comparing the incoming domain to a first predefined category having a first distribution list in response to identifying the incoming domain within the first predefined category, comparing the intended recipient to the first distribution list, and in response to identifying the intended recipient within the first distribution list, delivering the incoming e-mail to the intended recipient.

18. The data processing system of claim 17, wherein the list of blocked domains comprises a client recommended domain.

19. The data processing system of claim 18, wherein the client recommended domain is a previous domain from a previous e-mail delivered to a client.

20. The data processing system of claim 17, wherein the first predefined category comprises a client recommended domain.

* * * * *